(12) United States Patent
Suzuki et al.

(10) Patent No.: US 11,927,280 B2
(45) Date of Patent: Mar. 12, 2024

(54) DIAPHRAGM VALVE AND MONITORING METHOD THEREOF WITH IMPROVED LEAK DETECTION

(71) Applicant: FUJIKIN INCORPORATED, Osaka (JP)

(72) Inventors: Yuya Suzuki, Osaka (JP); Ryutaro Tanno, Osaka (JP); Daihi Tsuchiguchi, Osaka (JP); Nobuo Nakamura, Osaka (JP); Tsutomu Shinohara, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 645 days.

(21) Appl. No.: 16/972,717

(22) PCT Filed: May 17, 2019

(86) PCT No.: PCT/JP2019/019635
§ 371 (c)(1),
(2) Date: Dec. 7, 2020

(87) PCT Pub. No.: WO2020/003799
PCT Pub. Date: Jan. 2, 2020

(65) Prior Publication Data
US 2021/0262576 A1    Aug. 26, 2021

(30) Foreign Application Priority Data

Jun. 30, 2018  (JP) ................. 2018-125652

(51) Int. Cl.
*G01L 7/00*    (2006.01)
*F16K 7/12*    (2006.01)
(Continued)

(52) U.S. Cl.
CPC ............ *F16K 7/123* (2013.01); *F16K 25/005* (2013.01); *F16K 37/0041* (2013.01)

(58) Field of Classification Search
None
See application file for complete search history.

(56) References Cited

U.S. PATENT DOCUMENTS

2001/0025654 A1* 10/2001 Iritani ..................... F16K 7/126
                                                        251/331
2004/0099311 A1*  5/2004 Fukano ............... F16K 31/1221
                                                        137/312
(Continued)

FOREIGN PATENT DOCUMENTS

CN    104334943    2/2015
JP    S57-128902 A   8/1982
(Continued)

OTHER PUBLICATIONS

Office Action, China Patent Office, in counterpart Chinese Application No. 201980043717.5, dated Mar. 2, 2022 (with English translation).
(Continued)

*Primary Examiner* — Brandi N Hopkins
*Assistant Examiner* — Nigel H Plumb
(74) *Attorney, Agent, or Firm* — Greenblum & Bernstein, P.L.C.

(57) ABSTRACT

A diaphragm valve includes a valve body that defines a flow path through which fluid flows and an opening that opens to the outside in a middle of flow path; a flexible partition member that covers the opening and separates the flow path from the outside, and changes a cross-sectional area of the flow path; and a flexible support member disposed on a rear surface side opposite to a flow path side of the flexible
(Continued)

partition member. A housing is fixed to the valve body via peripheral portions of the flexible partition member and the flexible support member. A humidity sensor that detects a state of an atmosphere or a change thereof in a space defined by the flexible support member and an inner surface of the housing. The diaphragm valve is capable of preventing fluid in a diaphragm valve from leaking to the outside due to breakage of a diaphragm.

11 Claims, 10 Drawing Sheets

(51) Int. Cl.
    *F16K 25/00*      (2006.01)
    *F16K 37/00*      (2006.01)

(56) References Cited

U.S. PATENT DOCUMENTS

| | | | |
|---|---|---|---|
| 2012/0119130 A1* | 5/2012 | Reed | F16K 7/126 251/335.2 |
| 2015/0144822 A1 | 5/2015 | Akamoto et al. | |
| 2016/0123497 A1* | 5/2016 | Shinohara | F16K 37/0083 137/551 |

FOREIGN PATENT DOCUMENTS

| | | | |
|---|---|---|---|
| JP | 2309079 | * | 12/1990 |
| JP | H02-309079 A | | 12/1990 |
| JP | H06-101774 A | | 4/1994 |
| JP | H08-285090 A | | 11/1996 |
| JP | H08-303617 A | | 11/1996 |
| JP | 2001-317658 A | | 11/2001 |
| JP | 2001317658 | * | 11/2001 |
| JP | 2002-168176 | | 6/2002 |
| JP | 2004-19792 A | | 1/2004 |
| JP | 2004-176828 A | | 6/2004 |
| JP | 2013-500455 A | | 1/2013 |
| JP | 2013500455 | * | 1/2013 |
| JP | 2013-117241 | | 6/2013 |
| WO | 2014/196313 A1 | | 12/2014 |

OTHER PUBLICATIONS

International Search Report, WIPO, Application No. PCT/JP2019/019635, dated Aug. 20, 2019, English translation.

Written Opinion, WIPO, Application No. PCT/JP2019/019635, dated Aug. 20, 2019.

International Preliminary Report on Patentability, WIPO, Application No. PCT/JP2019/019635, dated Jan. 5, 2021.

* cited by examiner

[fig.6]
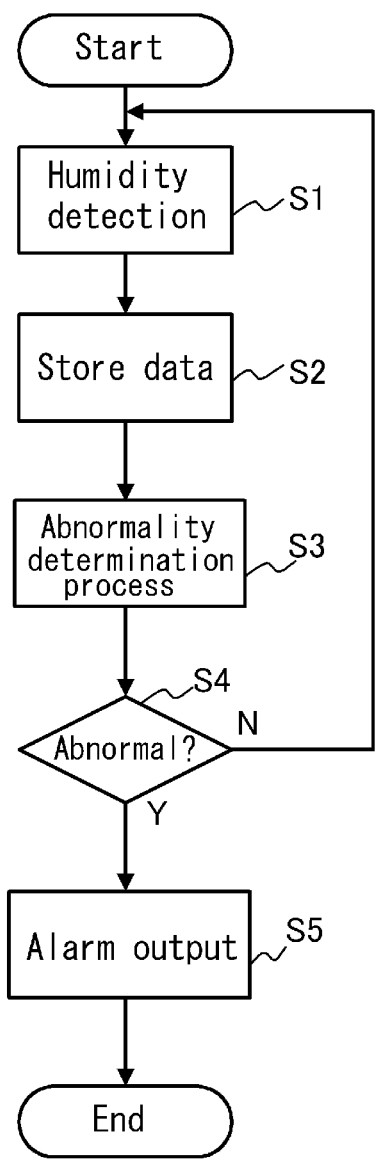

[fig.7]
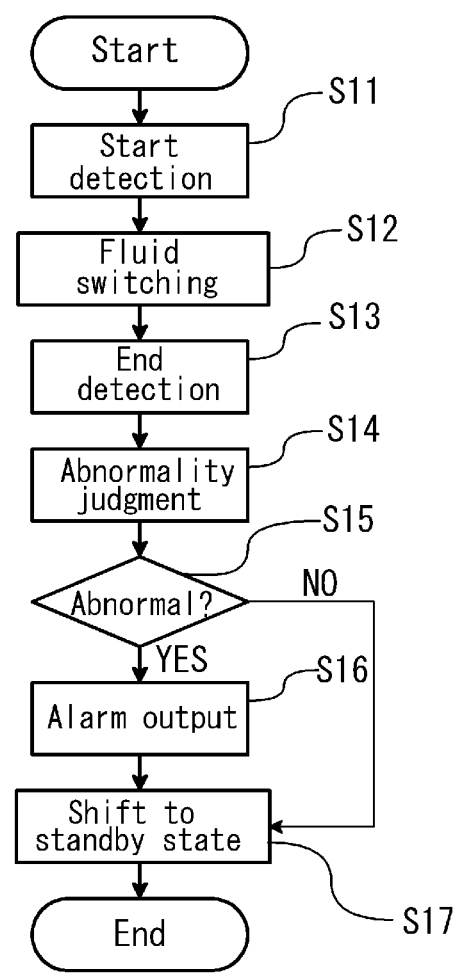

[fig.8]
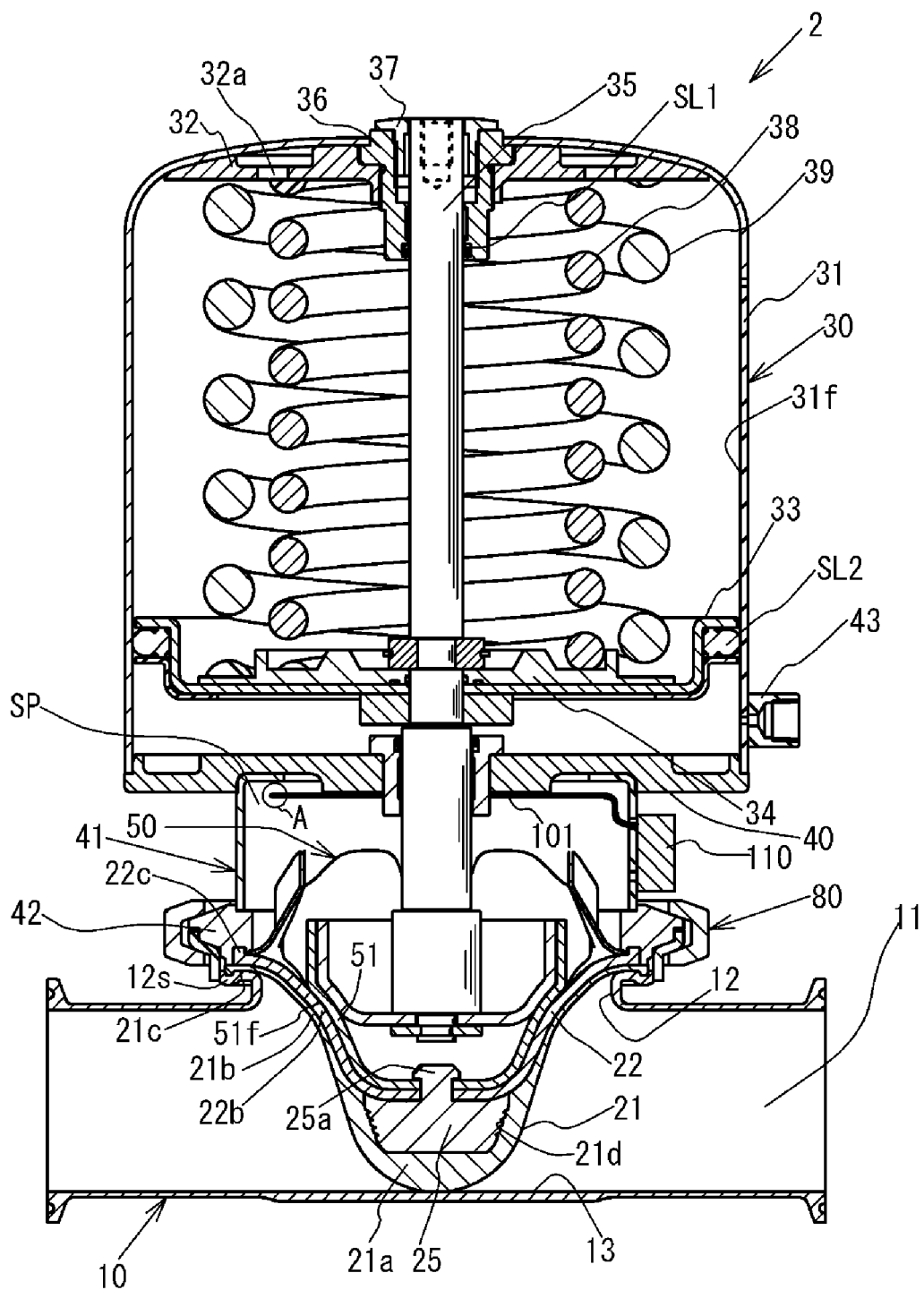

[fig.9]
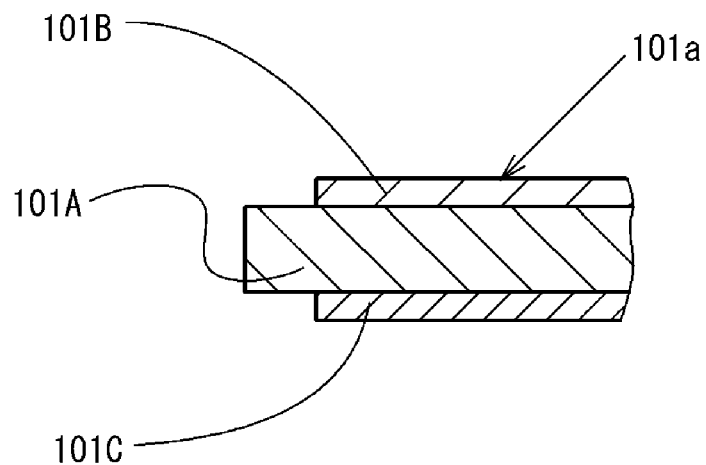
[fig.10]
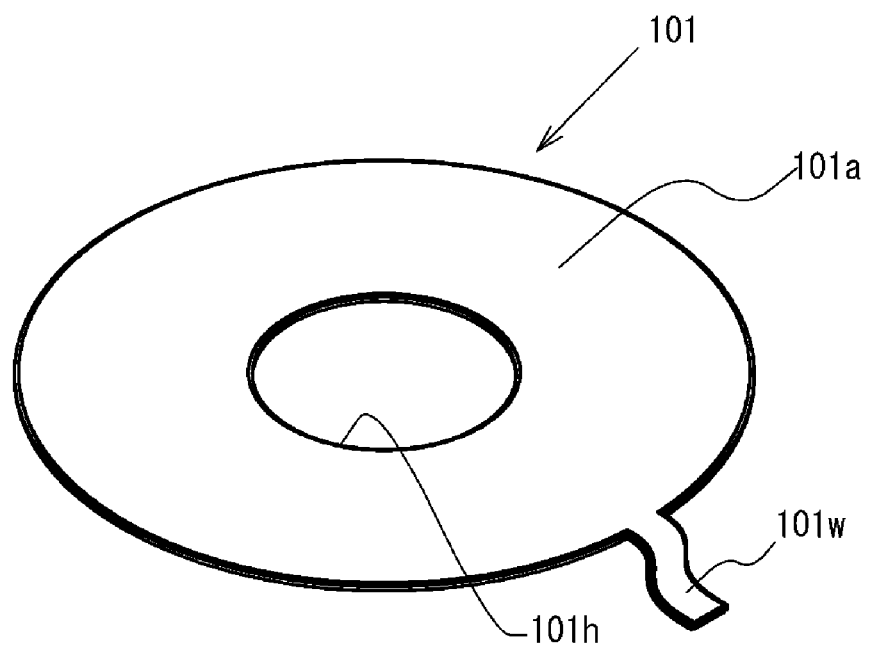

[fig.11]
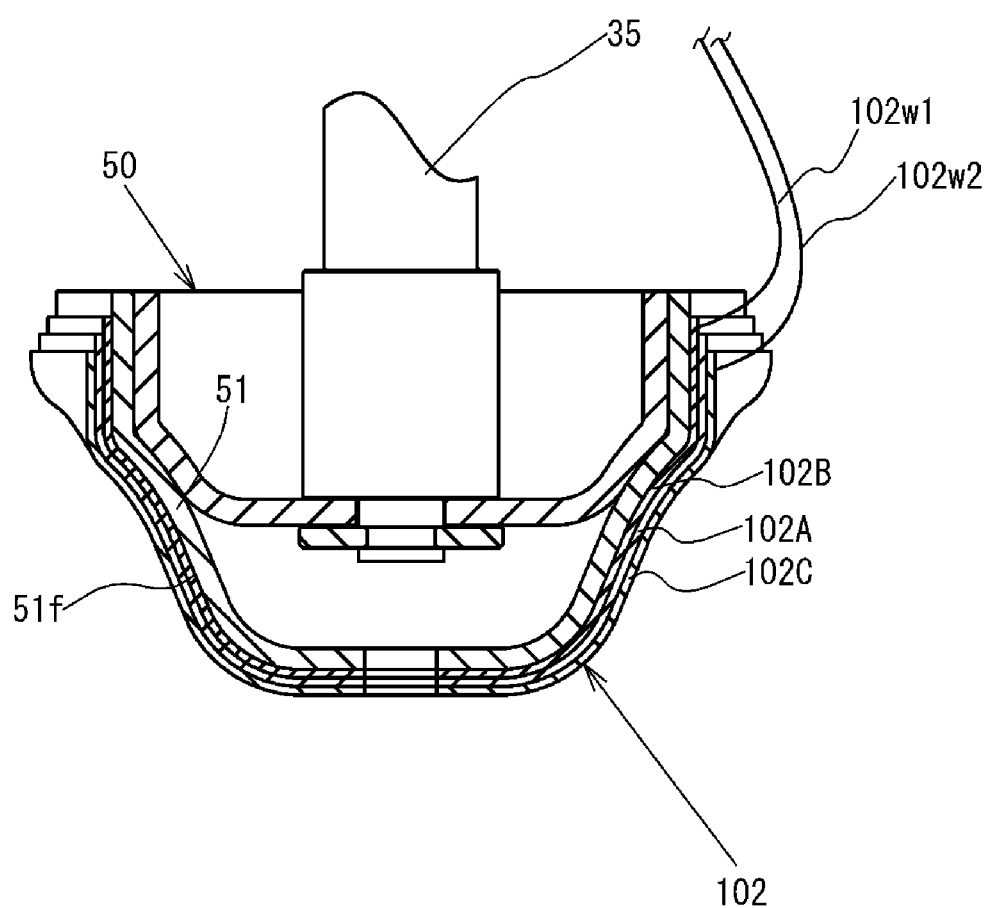

DIAPHRAGM VALVE AND MONITORING METHOD THEREOF WITH IMPROVED LEAK DETECTION

TECHNICAL FIELD

The present invention relates to a diaphragm valve and a monitoring method thereof.

BACKGROUND ART

Diaphragm valves are widely used in the biotechnology, pharmaceutical, chemical, food processing, beverage, cosmetics, and semiconductor industries. These industries require valves that prevent product contamination and leakage in valves, workshops, and the surrounding environment.

Various diaphragms of diaphragm valves exist such as those made of rubber. In order to achieve deformation required for the diaphragm, corrosion resistance, and prevention of contamination of fluid flowing through the valves, so-called two-piece type diaphragms are known, which are composed of a flexible partition member made of a polymer such as a fluorine-based resin disposed on a liquid contact side, and a flexible support member made of an elastomer mainly intended for cushioning disposed on a back side of the flexible partition member opposite to a liquid contact side (see, for example, Patent Literature 1 and 2).

Two-piece type diaphragms are superior to rubber diaphragms in terms of cleanliness and durability.

PTL 1: Japanese Patent Application Laid-Open No. 2013-500455

PTL 2: Japanese Patent Application Laid-Open No. H08-303617

SUMMARY OF INVENTION

Technical Problem

Patent Literatures 1 and 2 disclose techniques for providing sensors for detecting breakage of liquid-contacting flexible partition members.

However, in those techniques, when detecting the breakage of the flexible partition member of the wetted side, there is a possibility that the fluid in the diaphragm valve has already leaked to the outside.

One object of the present invention is to provide a diaphragm valve and a monitoring method of the diaphragm valve which can prevent fluid in the diaphragm valve from leaking to the outside due to breakage of the diaphragm.

Solution to Problem

The diaphragm valve of the present invention comprises:
a valve body that defines a flow path through which a fluid flows and an opening that opens to the outside in a middle of the flow path;
a flexible partition member that covers the opening and separates the flow path from the outside, and changes a cross-sectional area of the flow path;
a flexible support member disposed on a rear surface side opposite to a flow path side of the flexible partition member;
a housing fixed to the valve body via peripheral portions of the flexible partition member and the flexible support member; and
a sensor that detects a state of an atmosphere or a change thereof in a space defined by the flexible support member and an inner surface of the housing.

Preferably, the flexible partition member is designed to have a longer service life than the flexible support member.

The flexible partition member may be formed of a material different from the material forming the flexible support member in permeability to a specific gas.

In particular, the flexible partition member may be formed of a material permeable to water vapor, and the flexible support member may be formed of a material impermeable to water vapor.

In this case, the sensor may include a humidity sensor.

Alternatively, the sensor may be one which detects concentration or change thereof of a particular gas in the atmosphere, or humidity or change thereof in the atmosphere.

Preferably, the flexible partition member is formed of a polymer, and more preferably the flexible partition member is formed of polytetrafluoroethylene (PTFE).

Preferably, the flexible support member is formed of an elastomer. More preferably, the flexible support member is formed of a material selected from the group consisting of natural rubber, nitrile rubber, styrene rubber, butadiene rubber, isobutylene synthetic rubber, polychloroprene rubber, butyl rubber, fluororubber, silicon rubber, polyurethane rubber, and ethylene propylene diene rubber (EPDM).

The monitoring method of a diaphragm of the present invention is a monitoring method of a diaphragm valve comprising: a valve body defining a flow path in which a fluid flows, and an opening which opens to the outside in a middle of the flow path; a flexible partition member covering the opening, separating a flow path from the outside, and changing a cross-sectional area of the flow path; a flexible support member disposed on a rear surface side opposite to a flow path side of the flexible partition member; and a housing fixed to the valve body via peripheral portions of the flexible partition member and the flexible support member, the monitoring method comprises:
detecting a state or change thereof of an atmosphere in a space defined by the inner surface of the flexible support member and the housing; and
determining an abnormality based on the detection result.

Advantageous Effects of Invention

According to the present invention, it is possible to prevent leakage of fluid in the diaphragm valve to the outside due to breakage of the diaphragm.

BRIEF DESCRIPTION OF DRAWINGS

FIG. 6 is a flowchart showing the first monitoring method in the processing circuit.

FIG. 7 is a flowchart showing a second monitoring method in the processing circuit.

FIG. 8 is a longitudinal sectional view of a diaphragm valve according to a second embodiment of the present invention.

FIG. 9 is an enlarged sectional view in the circle A of FIG. 8.

FIG. 10 is an external perspective view of a flat humidity sensor.

FIG. 11 is an enlarged sectional view of a main portion of a diaphragm valve according to a third embodiment of the present invention.

DESCRIPTION OF EMBODIMENTS

Figure 1:
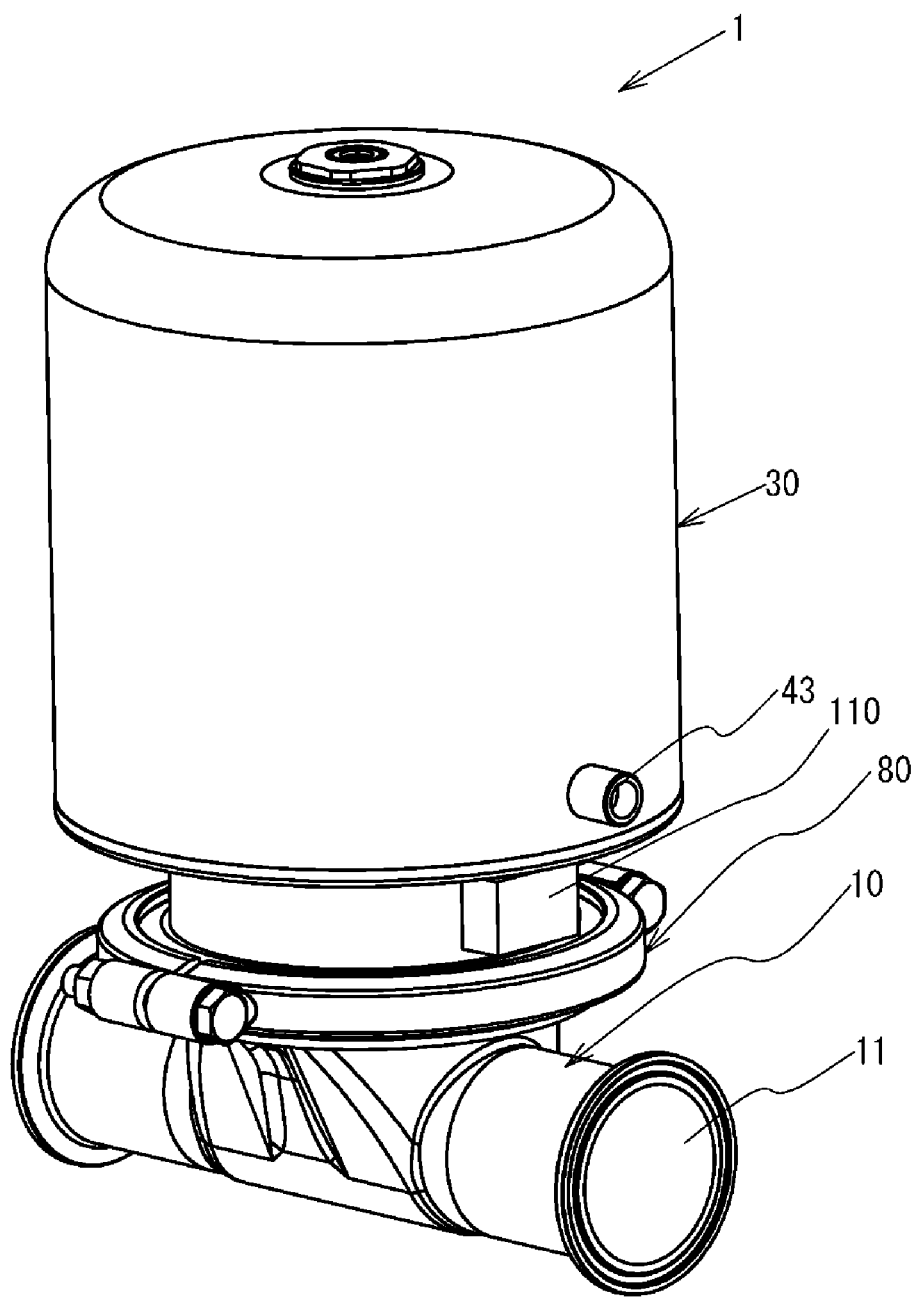
FIG. 1 is an external perspective view of a diaphragm valve according to a first embodiment of the present invention.

Embodiments of the present disclosure will be described below with reference to the drawings. In the description, the same elements are denoted by the same reference numerals, and a repetitive description is omitted as appropriate.

Figure 2:
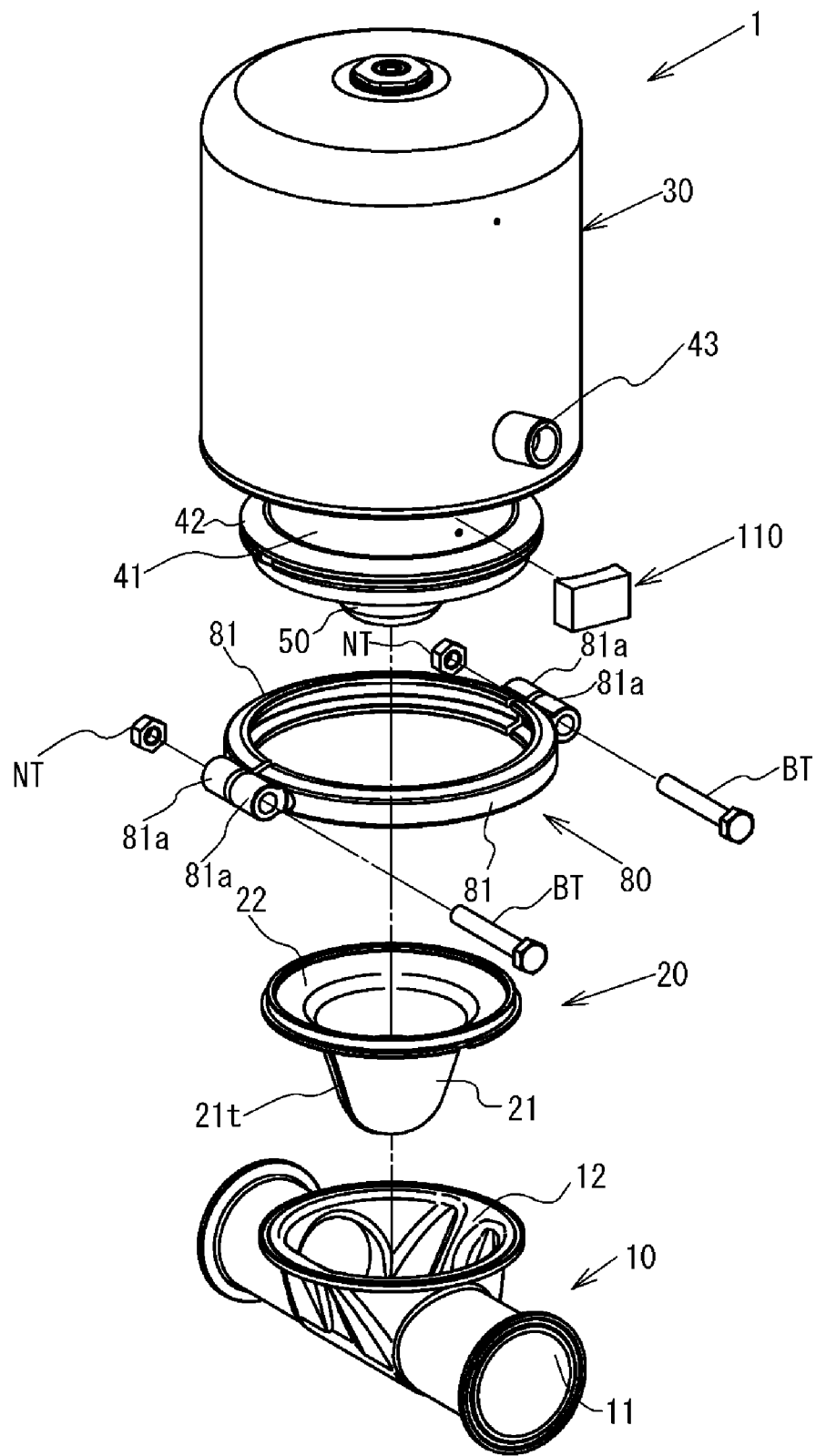
FIG. 2 is an exploded perspective view of the diaphragm valve of FIG. 1.
Figure 3:
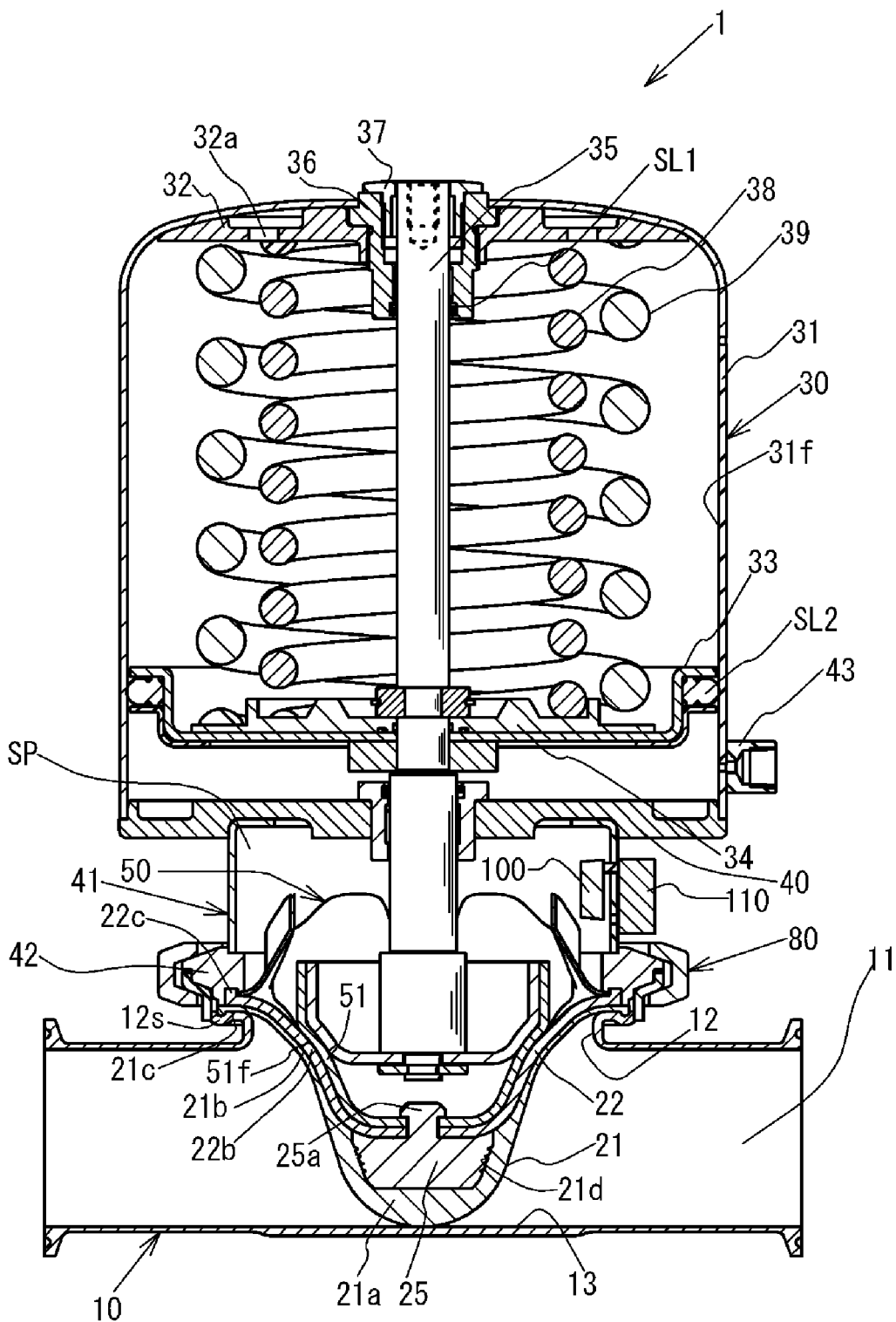
FIG. 3 is a longitudinal sectional view of the diaphragm valve of FIG. 1 in a state that the flow path is closed.
Figure 4:
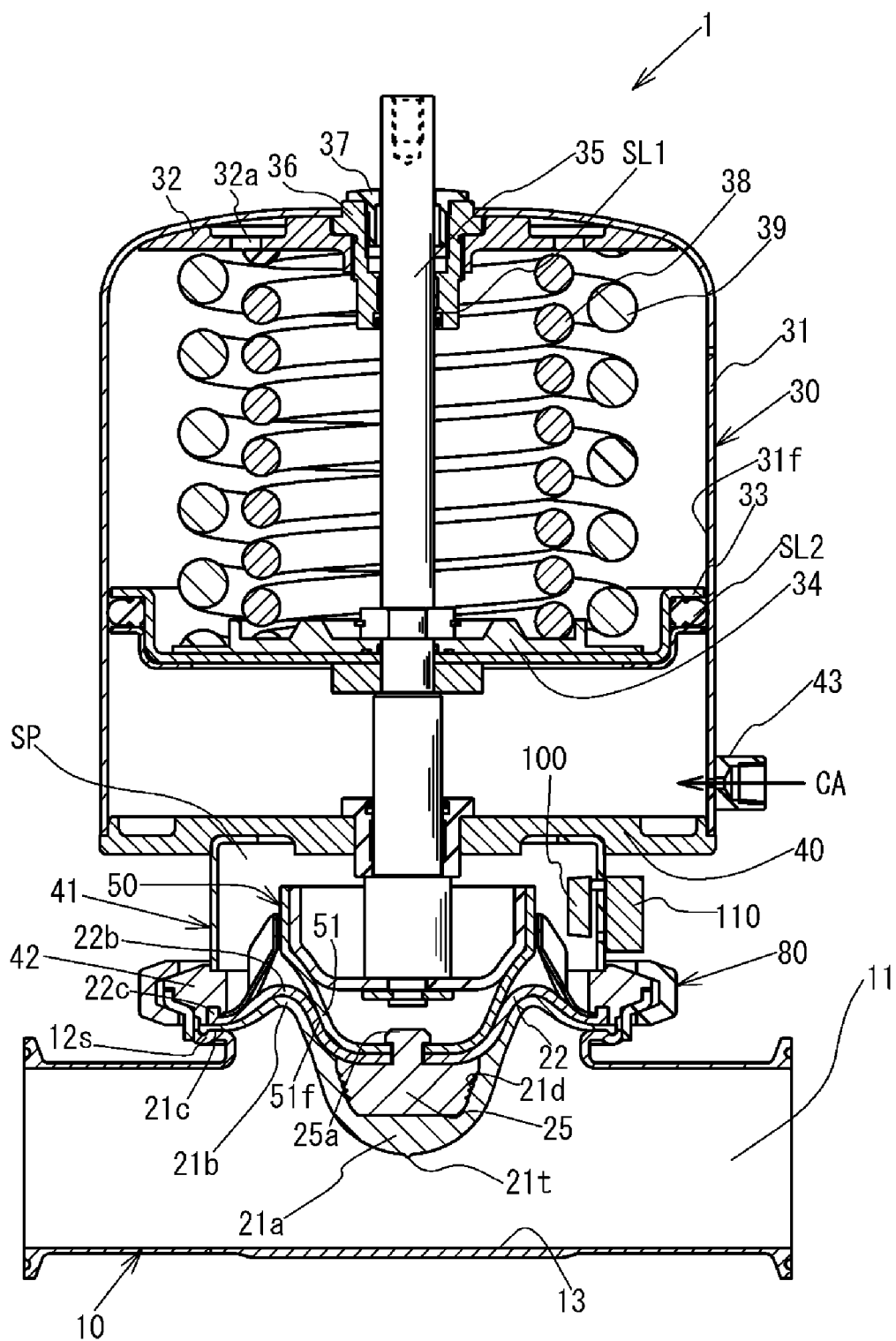
FIG. 4 is a longitudinal sectional view of the diaphragm valve of FIG. 1 in a state that the flow path is open.

FIG. 1 is an external perspective view of a diaphragm valve 1 according to a first embodiment of the present invention. FIG. 2 is an exploded perspective view of the diaphragm valve 1 of FIG. 1. FIG. 3 is a longitudinal sectional view of the diaphragm valve 1 in which flow path is closed. FIG. 4 is a longitudinal sectional view of the diaphragm valve 1 in which flow path is open.

The diaphragm valve 1 includes a valve body 10, a diaphragm 20, an actuator 30, a compressor 50 coupled to the actuator 30, a piston 33 for driving the compressor 50, and a clamper 80 for fixing a housing 41 to be described later fixed to the actuator 30 to the valve body 10.

The valve body 10 is made of a metallic alloy and has a flow path 11 and an opening 12 which opens to the outside in the middle of the flow path 11, and the tube (not shown) is connected to both ends of the flow path 11, respectively. As shown in FIG. 3, a sealing surface 13 against which a flexible partition member 21 described later abuts is formed in the flow path 11 of the valve body 10.

The diaphragm 20 has a flexible partition member 21 and a flexible support member 22.

The flexible partition member 21 is formed of a polymer. In this embodiment, the flexible partition member 21 is formed of, for example, polytetrafluoroethylene (PTFE) which permeates water vapor as a specified gas.

As shown in FIGS. 2 and 3, the diaphragm 20 has a bell cup shape. The lower portion including the distal end center portion of the flexible partition member 21 forms a thick portion 21a, and the outer peripheral side portion continuously with this forms a thin portion 21b. An annular seal projection 21c is formed on the outer peripheral edge portion of the thin portion 21b so as to abut the support portion 12s formed on the peripheral portion of the opening 12 of the valve body 10. Further outer peripheral edge portion of the seal projection 21c of the flexible partition member 21 is guided by a concave guide portion formed in the support portion of the valve body 10. A single seal projection 21t is formed on the wetted surface of the flexible partition member 21 (see FIGS. 2 and 4), and when the flexible partition member 21 closes flow path 11, the seal projection 21t is pressed against the sealing surface 13 to block the flow path 11. A locking recess 21d for locking the metal connecting member 25 is formed in the center portion of the rear surface side opposite to the wetted surface of the flexible partition member 21. The connecting member 25 penetrates the flexible support member 22 and is connected to the compressor 50 by its connecting portion 25a.

The flexible support member 22 is disposed so as to face the back surface of the flexible partition member 21 opposite to the wetted surface. The flexible support member 22 serves as a cushion for the main purpose of preventing wear or breakage of the flexible partition member 21. Rubber or elastomers are used for the flexible support member 22, and for example, natural rubber, nitrile rubber, styrene rubber, butadiene rubber, isobutylene synthetic rubber, polychloroprene rubber, butyl rubber, fluorine rubber, silicone rubber, polyurethane rubber, ethylene propylene diene rubber, or the like having excellent heat resistance, cold resistance, flexibility, and corrosiveness can be used, and in this embodiment, the flexible support member 22 is formed using a EPDM that does not transmit water vapor as a specified gas.

In the outer peripheral edge portion of the flexible support member 22, an annular convex portion 22c is formed, which is fitted into the groove of the annular member 42 which is fixed to the lower end portion of the housing 41 to be described later.

The actuator 30 includes a casing 31 having a bottomed cylindrical shape, an upper support plate 32 provided on a ceiling portion of the casing 31, a piston 33 provided on an inner peripheral surface 31f of the casing 31 so as to be movable within the casing 31 via a seal member SL2, a lower support plate 34 supported by the piston 33, a stem 35 provided on a center portion of the casing 31 and connected to the piston 33 and extending through the lower plate 40 of the casing toward the valve body 10, a housing 41 fixed to a lower surface side of the lower plate 40, and a compressor 50 fixed to a lower end portion of the stem 35.

Between the upper support plate 32 or the piston 33 and the lower support plate 34, two coil springs 38 and 39 are provided to constantly bias the piston 33 toward the lower plate 40. A plurality of vent holes 32a is formed in the upper support plate 32, to make the inside and outside of the casing 31 communicate with each other.

A guide member 36 and a fixing member 37 are provided on the outer periphery of the upper end portion of the stem 35, and between the guide member 36 and the stem 35 is sealed by the seal member SL1.

On the outer peripheral surface of the casing 31, an air port 43 is provided for supplying compressed air CA to the space between the piston 33 of the casing 31 and the lower plate 40 or for discharging air from the space.

The housing 41 is fixed to the lower plate 40 of the actuator 30 and forms a housing space SP for accommodating the compressor 50 together with the flexible support member 22 of the diaphragm 20. A humidity sensor 100 to be described later is provided on the inner wall of the housing space SP of the housing 41, and a circuit box 110 incorporating a processing circuit electrically connected to the humidity sensor 100 is fixed to the outer wall of the housing 41.

An annular member 42 is integrally fixed to a lower end portion of the housing 41. The annular member 42 is fastened to the support portion 12s of the valve body 10 by a clamper 80 via the flexible partition member 21 and the flexible support member 22.

The clamper 80 includes a pair of semicircular members 81, a bolt BT penetrating through the connecting hole portion 81a provided in each semicircular member 81, and a nut NT screwed with the bolt BT, and converts the fastening force of the bolt BT and the nut NT into a force for pressing the annular member 42 against the support portion 12s of the valve body 10.

The compressor 50 is made of a metal alloy and has a pressing portion 51 which directly contact with the flexible support member 22 and is connected to the connecting member 25. The contact state between a pressing surface 51f of the pressing portion 51 and the flexible support member 22 is changed by the vertical movement of the compressor 50.

Here, the basic operation of the diaphragm valve 1 described above will be described.

In the state shown in FIG. 3, the coil springs 38 and 39 bias the piston 33 downward, the pressing portion 51 of the compressor 50 presses the flexible partition member 21 through the flexible support member 22 to the sealing surface 13 of the valve body 10, and the flow path 11 of the valve body 10 is in a state of being closed.

From this state, as shown in FIG. 4, when the compressed air CA is supplied into the casing 31 through the air port 43, the piston 33 moves upward against the biasing force of the coil springs 38 and 39 by the pressure of the compressed air CA. Accordingly, the stem 35 also moves upward. Thus, the pressing force acting on the flexible partition member 21 via the flexible support member 22 from the pressing portion 51 of the compressor 50 is released, and flow path 11 of the valve body 10 is opened.

When the stem 35 moves upward, as shown in FIG. 4, it can be seen that the thin portion 21b of the flexible partition member 21 is bent. The flexible support member 22 also bends in response to the bend of the thin portion 21b of the flexible partition member 21. The bending portion 22b of the flexible support member 22, as can be seen from FIG. 3, is also a portion to be pressed by the pressing surface 51f of the pressing portion 51 of the compressor 50. To the bending portion 22b of the flexible support member 22, application of pressing force from the pressing surface 51f of the pressing portion 51 of the compressor 50 and bending after release of the pressing force are repeated along with the opening and closing operation of the diaphragm valve 1. Therefore, among the constituent members of the diaphragm 20, the bending portion 22b of the flexible support member 22 is placed under the most severe condition against wear or breakage.

In the present embodiment, noticing that the bending portion 22b of the flexible support member 22 is placed under the most severe conditions against wear and breakage, in the design stage of the flexible partition member 21 and the flexible support member 22, the bending portion 22b of the flexible support member 22 is designed to be broken first. That is, the flexible support member 22 is designed in advance so that the service life thereof is shorter than that of the flexible partition member 21. The design for setting such a service life is easily possible by considering the shape, dimensions, materials, applied load, the material of the compressor 50, the use conditions, various experiments and the like of the flexible partition member 21 and the flexible support member 22.

The humidity sensor 100 detects humidity or its change in the housing space SP of the housing 41 and outputs it as an electrical signal to the processing circuit in the circuit box 110. A well-known humidity sensor can be employed as the humidity sensor 100.

Although not shown, the processing circuit in the circuit box 110 is composed of hardware such as a processor, an input/output circuit, a communication circuit memory, and the like, and required software.

Figure 5:
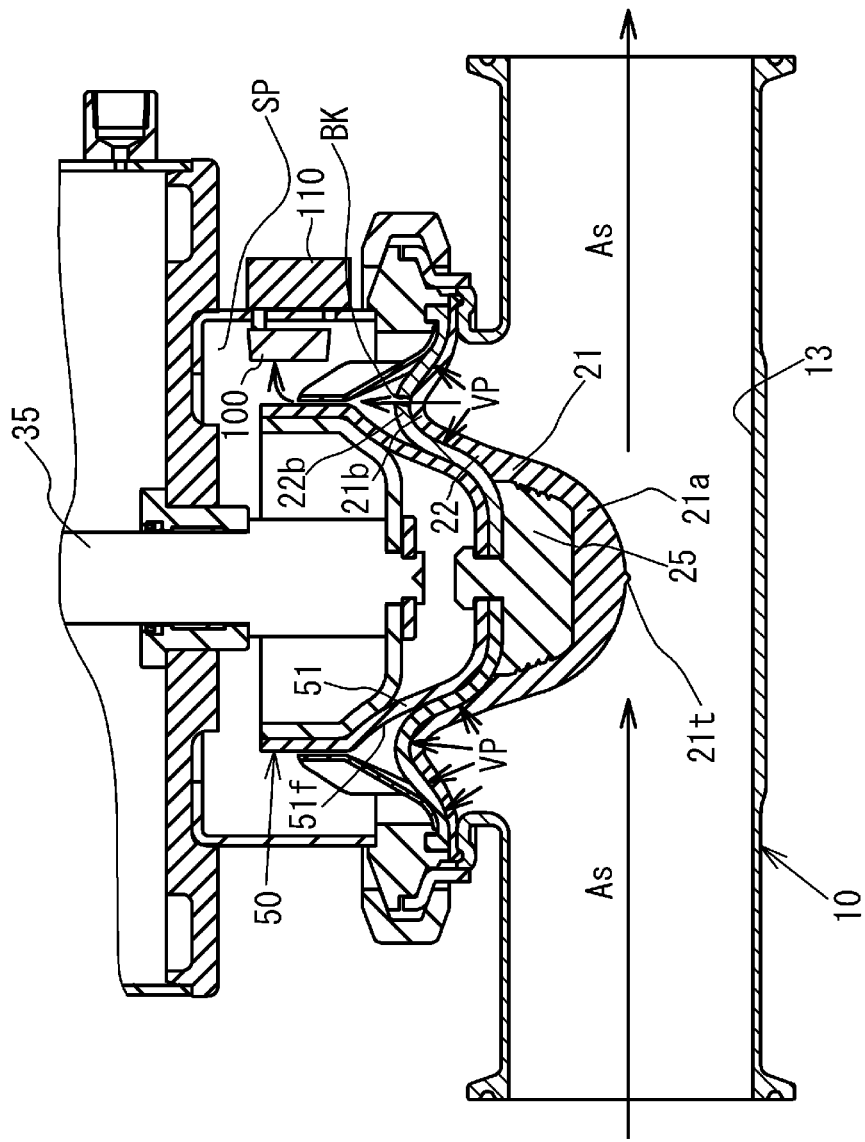
FIG. 5 is an enlarged sectional view illustrating a state in which the flexible support member is broken.

Next, a first monitoring method of the diaphragm valve 1 according to the present embodiment will be described with reference to FIGS. 5 and 6.

For example, in the flow path 11 of the diaphragm valve 1 through which the aqueous solution As flows, water of a portion of the aqueous solution As is vaporized to form water vapor. A part of the water vapor permeates PTFE forming the flexible partition member 21, but the water vapor does not permeate EPDM forming the flexible support member 22, so that the humidity in the housing space SP of the housing 41 does not change greatly.

When repeating the opening and closing operation of the diaphragm valve 1, wear and deterioration of the bending portion 22b of the flexible support member 22 described above progress, and as shown in FIG. 5, first, a broken portion BK is generated in the bending portion 22b of the flexible support member 22.

When the broken portion BK is generated, water vapor VP which has been prevented from entering into the housing space SP by EPDM forming the flexible support member 22 enters the housing space SP through the broken portion BK of the flexible support member 22. As a result, the humidity in the housing space SP of the housing 41 rises rapidly.

In the present embodiment, abnormality of the diaphragm valve 1 is detected by detecting humidity change in the housing space SP caused by the broken portion BK of the flexible support member 22.

Specifically, as shown in FIG. 6, the processing circuit in the circuit box 110 detects the humidity based on the electrical signal from the humidity sensor 100 at a predetermined sampling time interval (step S1). The detected humidity data is stored in the memory (step S2).

The processing circuit executes an abnormality detection process using the recorded data.

In the abnormality determination process (step S3), the abnormality is determined from the variation of the humidity data of the housing space SP of the housing 41 stored in the memory, but the detection accuracy can be enhanced by, for example, an averaging process or reference of humidity information of the external environment. Any processing can be employed as long as it improves detection accuracy of the change of the humidity in the housing space SP.

In the processing circuit, it is determined whether abnormality is present (step S4), and when no abnormality is present, the processing of the above steps S1 to S3 is repeated. If abnormality is determined, an alarm is output (step S5). For example, an alarm signal is output from the diaphragm valve 1 by a wireless signal and received by a monitoring device composed of a personal computer or the like.

Next, a second monitoring method will be described with reference to FIGS. 5 and 7.

In the second monitoring method, abnormality is determined from a change in humidity data detected by the humidity sensor 100 when the fluid flowing through the diaphragm valve 1 is switched between the aqueous solution As and high-temperature water vapor. If the broken portion BK is present in the flexible support member 22 as in FIG. 5, although the humidity sensor 100 as described above detects a higher humidity than the outside air, the humidity converges to a certain steady value when the size of the broken portion BK is constant. This is because the housing space SP partially discharges moisture to the outside air through the breathing holes. Here, when the fluid is switched from the aqueous solution to the high-temperature water vapor, since the vapor pressure of the high-temperature water vapor is higher than that of the aqueous solution, the amount of water fed into the housing space SP through the broken portion BK increases, and the humidity detected by the humidity sensor 100 rises. On the other hand, when the broken portion BK does not exist, the humidity in the housing space SP is maintained at a substantially constant value regardless of the switching of the fluid. By detecting this difference, the presence or absence of the broken portion BK and the size thereof can be detected.

A specific procedure will be described with reference to FIG. 7.

First, a signal of measurement start is sent to the circuit box 110, and the circuit box 110 detects humidity by the humidity sensor 100 and starts operation of storing the humidity data into the memory at predetermined sampling intervals (step S11).

Next, the fluid flowing into the diaphragm valve 1 is switched from the aqueous solution to the high-temperature water vapor (step S12). The detection is continued until the fluid is sufficiently switched, and then the detection is terminated (step S13). The timing at which the detection is terminated is, for example, until a predetermined time elapses from the start of the detection in step S11.

Based on the detected humidity data, the processing circuit determines abnormality (step S14). Specifically, with respect to the humidity data M (t) that changes in time, curve fitting is performed with A, B, and To as variables by a function x (t) = A + B · H (t−T$_0$). Here, H(t) is a unit step function. When it can be inferred that the absolute value |B| of the value of B obtained by curve fitting is a humidity change accompanying fluid switching and the humidity change |B| is larger than a predetermined value Bth, it is determined as abnormal.

On the basis of the result of the abnormality determination (step S15), if an abnormality is determined, an alarm is output (step S16). After no abnormality is determined in step S15 or an alarm is output in step S16, the processing circuit goes to a standby state that is in a power saving state (step S17), and the process ends.

This process of switching fluid to high-temperature water vapor is a process that is usually performed regularly for the purpose of high temperature sterilization in valves for primarily sanitary applications, and does not require an additional process for abnormal detection of the valves.

The second monitoring method is different from the first monitoring method in that it is not necessary to constantly acquire data. Therefore, it is possible to reduce the power consumption in the circuit box 110. In particular, when the circuit box 110 is operated with a built-in battery for wireless communication, the frequency of replacing the battery can be reduced.

In the present embodiment, since the flexible support member 22 is designed to be broken prior to breakage of the flexible partition member 21, and abnormality is detected from the humidity change of the atmosphere in the housing space SP of the housing 41 caused by the breakage of the flexible support member 22, it is possible to prevent breakage of the flexible partition member 21 to thereby prevent the liquid flowing through flow path 11 of the diaphragm valve 1 from leaking to the outside.

Second Embodiment

FIG. 8 shows a longitudinal cross-sectional view of the diaphragm valve 2 according to the second embodiment of the present invention. The same parts as those of the first embodiment are denoted by the same reference numerals, and the description thereof will be omitted.

The diaphragm valve 2 has a planar humidity sensor 101 in the housing space SP.

For the planar humidity sensor 101, an enlarged cross-sectional view is shown in FIG. 9, and a perspective view is shown in FIG. 10. The planar humidity sensor 101 has a humidity-sensitive layer 101A (dielectric portion) having a hygroscopic property, sandwiched by an upper electrode 101B and a lower electrode 101C, thereby forming a parallel flat plate structure. The humidity-sensitive layer 101A is made of a material having a high hydrophilicity and an impedance which changes with moisture absorption, such as a cellulose-based film or polyimide. The lower electrode 101C is formed of a conductive material such as a thin film having a large number of small holes or a thin film having a porous structure. Thus, the humidity-sensitive layer 101A can absorb and release moisture with respect to the air in the housing space SP. The upper electrode 101B is made of a metal thin film and a resist for insulating coating a metal thin film, and is fixed to the lower plate 40 at the top of the housing space SP.

As shown in FIG. 10, the planar humidity sensor 101 includes a humidity sensing portion 101a in the shape of a disk-shaped flat plate, and a connecting portion 101w for connecting the humidity sensing portion 101a to the circuit box 110.

Since the humidity sensing portion 101a has a hole 101h through which the stem 35 penetrates in the central portion, and can cover the entire upper portion of the diaphragm 20 after disposing the stem 35 just above the center of the diaphragm 20 in the housing space SP, the wetting detection to be described later can be reliably performed regardless of where a crack occurs in the entire area of the diaphragm 20. The connecting portion 101w is an elongated rectangular flat plate extending from the outer periphery of the humidity sensing portion 101a, and one end thereof is inserted to be connected to a connector (not shown) in the circuit box 110. The humidity sensing portion 101a and the connecting portion 101w may be formed integrally.

When the humidity of the housing space SP rises, the humidity-sensitive layer 101A of the humidity sensing portion 101a absorbs moisture, the impedance between the upper electrode 101B and the lower electrode 101C changes, and the circuit of the circuit box 110 can measure the impedance and detect the humidity.

When the humidity-sensitive layer 101A is wetted by liquid water, the impedance between the upper electrode 101B and the lower electrode 101C is extremely lowered. By comparing the measured impedance with a predetermined threshold, wetness detection can be performed to determine whether or not a part of the planar humidity sensor 101 is wetted by liquid water. As a result, it can be detected that a breakage is formed in the diaphragm 20 and the aqueous solution As flowing through the diaphragm valve 1 leaks into the housing space SP.

Third Embodiment

FIG. 11 shows an enlarged cross-sectional view of a main part of a diaphragm valve which is a third embodiment of the present invention. The same parts as those of the above-described embodiments are given the same numerals, and descriptions thereof are omitted.

The diaphragm valve according to the present embodiment, has a humidity sensor 102 along the pressing surface (lower surface) 51f of the compressor 50. FIG. 11 is a diagram illustrating the periphery of the compressor 50, which emphasizes the thickness of the humidity sensor 102 so that the structure of the humidity sensor 102 is easily understood.

The humidity sensor 102 has a humidity-sensitive layer 102A (dielectric portion) having a hygroscopic property sandwiched by an upper electrode 102B and a lower electrode 102C, thereby forming a parallel flat plate structure. The humidity-sensitive layer 102A is made of a material having a high hydrophilicity and an impedance that changes with moisture absorption, and is a thin film made of, for example, a cellulose-based film or polyimide. The lower electrode 102C is, for example, a thin film having a large number of small holes or a thin film having a porous structure, and is formed of a conductive material. Thus, the humidity-sensitive layer 102A can absorb and release moisture with respect to the air in the housing space SP. The upper electrode 102B is a conductive thin film formed on the surface of the compressor 50, but the compressor 50 itself formed of metal may be used as the upper electrode 102B.

The upper electrode 102B and the lower electrode 102C are electrically connected to the circuit of the circuit box 110 by wiring lines 102w1 and 102w2, respectively.

When the humidity of the housing space SP rises, the humidity-sensitive layer 102A absorbs moisture, and the impedance between the upper electrode 102B and the lower electrode 102C changes. The circuit in the circuit box 110 can detect the humidity by measuring the impedance between the upper electrode 102B and the lower electrode 102C.

When the humidity-sensitive layer 102A is wetted by liquid water, the impedance between the upper electrode 102B and the lower electrode 102C is extremely lowered. By comparing the measured impedance with a predetermined threshold, wetness detection can be performed to determine whether a portion of the planar humidity sensor 102 is wetted by liquid water. As a result, it can be detected that the diaphragm 20 has a breakage and the aqueous solution As flowing through the diaphragm valve 1 leaks into the housing space SP.

Since the humidity sensor 102 is positioned in the immediate vicinity of the diaphragm 20 and covers upper surface of the diaphragm 20, leakage can be detected immediately regardless of where the diaphragm 20 is broken.

In the above embodiments, the sensor employed is a humidity sensor, the specific gas is water vapor, the flexible partition member 21 is formed of a water vapor permeable PTFE, and the flexible support member 22 is formed of a water vapor impermeable EPDM, but the present invention is not limited thereto.

For example, when the liquid flowing through the diaphragm valve 1 generates a specific gas, the flexible partition member and the flexible support member are formed of materials having different permeabilities to the specific gas. And, instead of the humidity sensor, a sensor capable of detecting the concentration of the specific gas or its change is installed in the housing space SP. By adopting such a configuration, it is possible to prevent the liquid from leaking to the outside. The liquid is, for example, an organic solvent having a low boiling point such as ethanol.

Although the humidity sensor 100 is installed in the housing space SP in the above embodiments, it may be installed outside the housing space SP as long as the humidity or the humidity change in the housing space SP can be detected.

Although a diaphragm valve having a sealing surface along flow path is exemplified in the above embodiments, the present invention is also applicable to a diaphragm valve of a so-called wear type.

While the present invention has been described based on the embodiments, it is needless to say that the present invention is not limited to the embodiments, and various changes can be made within a range not departing from the gist of the present invention.

Accordingly, the technical scope of the present invention includes embodiments variously modified within a range not departing from the gist of the present invention, which is obvious to a person skilled in the art from the description of the patent claims.

REFERENCE SIGNS LIST 1, 2: Diaphragm valve
10: Valve body
11: Flow path
12: Opening
12s: Support portion
13: Sealing surface
20: Diaphragm
21: Flexible partition member
21a: Thick portion
21b: Thin portion
21c: Seal projection
21d: Locking recess
21t: Seal projection
22: Flexible support member
22b: Bending portion
22c: Annular convex portion
25: Connecting member
25a: Connecting portion
30: Actuator
31: Casing
31f: Inner peripheral surface
32: Upper support plate
32a: Vent hole
33: Piston
34: Lower support plate
35: Stem
36: Guide member
37: Fixing member
38: Coil spring
39: Coil spring
40: Lower plate
41: Housing
42: Annular member
43: Air port
50: Compressor
51: Pressing portion
51f: Pressing surface
80: clamper
81: Semicircular member
81a: Connecting hole portion
100: Humidity sensor
101: Planar humidity sensor
102: Humidity sensor
110: Circuit box
As: Aqueous solution
BK: broken portion
BT: Bolt
CA: Compressed air
NT: Nut
SL1: Seal member
SL2: Seal member
SP: Housing space
VP: Water vapor

The invention claimed is:
1. A diaphragm valve comprising:
a valve body that defines a flow path through which a fluid flows and an opening that opens to the outside in a middle of the flow path;
a flexible partition member that covers the opening and separates the flow path from the outside, and changes a cross-sectional area of the flow path;
a flexible support member disposed on a rear surface side opposite to a flow path side of the flexible partition member;
a housing fixed to the valve body via peripheral portions of the flexible partition member and the flexible support member; and a humidity sensor that detects a humidity of an atmosphere or a change thereof in a space defined by the flexible support member and an inner surface of the housing, wherein the humidity sensor has a flat plate shape having a hole in a center and is disposed on a ceiling of said space, or the humidity sensor is disposed on a surface of a compressor between the flexible support member and the compressor.

2. The diaphragm valve according to claim 1, wherein the flexible partition member is designed to have a longer service life than the flexible support member.

3. The diaphragm valve according to claim 1, wherein the flexible partition member is formed of a material different from a material forming the flexible support member in permeability to a specific gas.

4. The diaphragm valve according to claim 1, wherein the flexible partition member is formed of a material permeable to water vapor and the flexible support member is formed of a material impermeable to water vapor.

5. The diaphragm valve according to claim 1, wherein the flexible partition member is formed of a polymer.

6. The diaphragm valve according to claim 5, wherein the flexible partition member is formed of polytetrafluoroethylene (PTFE).

7. The diaphragm valve according to claim 1, wherein the flexible support member is formed of an elastomer.

8. The diaphragm valve according to claim 7, wherein the flexible support member is formed of a material selected from the group consisting of natural rubber, nitrile rubber, styrene rubber, butadiene rubber, isobutylene synthetic rubber, polychloroprene rubber, butyl rubber, fluororubber, silicon rubber, polyurethane rubber, and ethylene propylene diene rubber (EPDM).

9. A monitoring method of a diaphragm valve, the diaphragm valve comprising: a valve body defining a flow path through which a fluid flows, and an opening which opens to the outside in a middle of the flow path; a flexible partition member covering the opening, separating the flow path from the outside, and changing a cross-sectional area of the flow path; a flexible support member disposed on a rear surface side opposite to a flow path side of the flexible partition member; and a housing fixed to the valve body via peripheral portions of the flexible partition member and the flexible support member, the monitoring method comprising:

detecting a humidity or change thereof of an atmosphere in a space defined by an inner surface of the flexible support member and the housing by a humidity sensor that has a flat plate shape having a hole in a center and is disposed on a ceiling of said space, or by a humidity sensor that is disposed on a surface of a compressor between the flexible support member and the compressor; and determining abnormality based on the detection result.

10. The monitoring method of a diaphragm valve according to claim 9, wherein the fluid flowing through the diaphragm valve is switched between start and end of the detection.

11. The monitoring method of a diaphragm valve according to claim 9, wherein the fluid flowing through the diaphragm valve is switched, and wherein the state or change thereof of the atmosphere in the space is detected after the switching, and the detection is terminated when a predetermined condition is satisfied.

\* \* \* \* \*